UNITED STATES PATENT OFFICE.

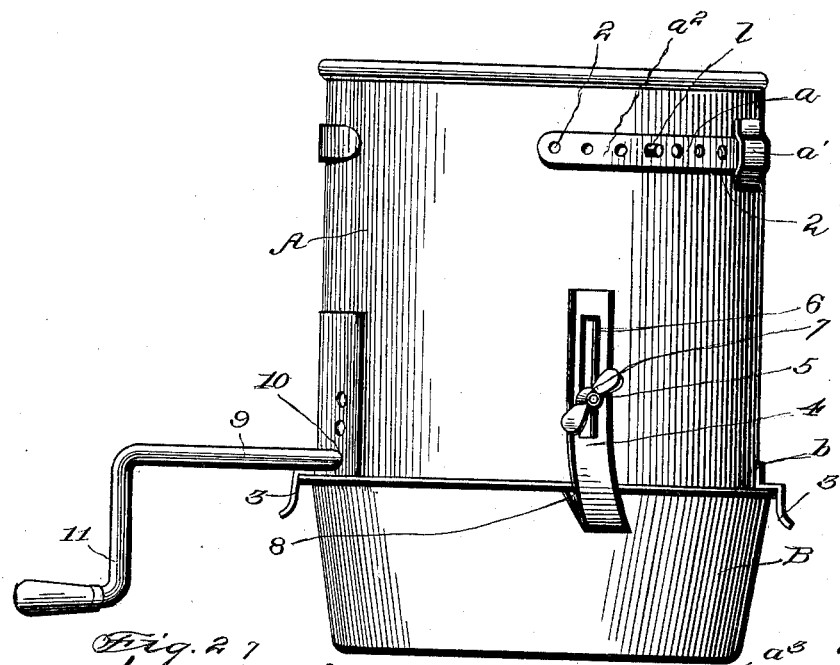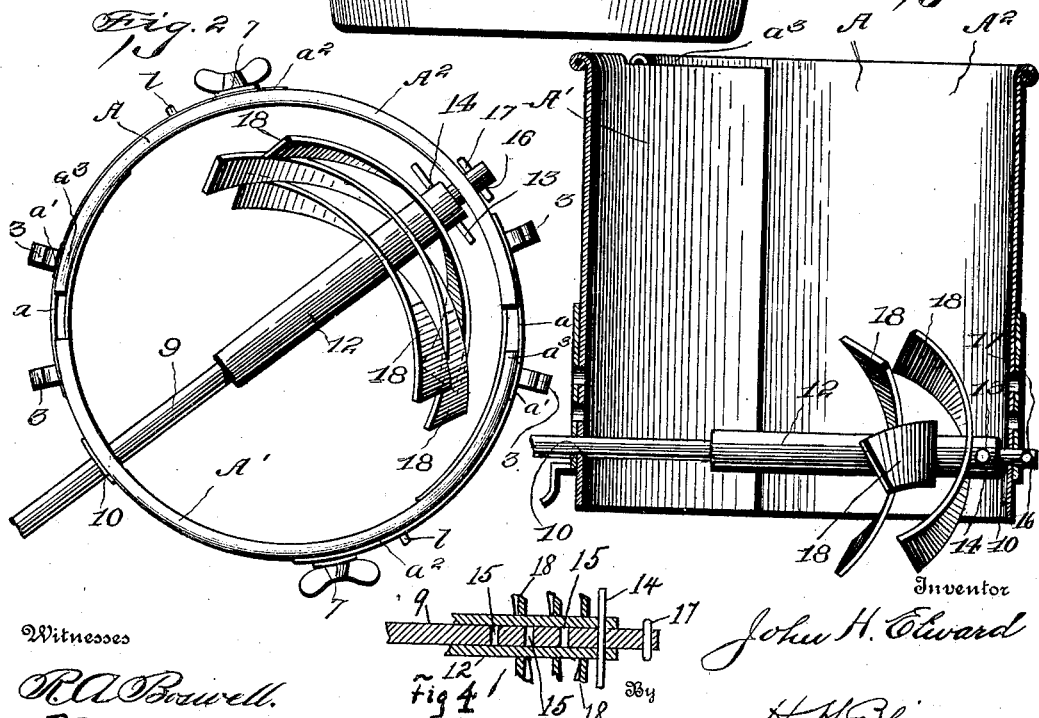

JOHN H. ELWARD, OF PRETTY PRAIRIE, KANSAS.

MIXING-MACHINE.

SPECIFICATION forming part of Letters Patent No. 707,404, dated August 19, 1902.

Application filed March 31, 1902. Serial No. 100,853. (No model.)

*To all whom it may concern:*

Be it known that I, JOHN H. ELWARD, a citizen of the United States, residing at Pretty Prairie, in the county of Reno and State of Kansas, have invented certain new and useful Improvements in Mixing-Machines, of which the following is a specification, reference being had therein to the accompanying drawings.

Figure 1 is a side view of a stirring and mixing machine for making bread and for other purposes embodying my invention. Fig. 2 is a plan view of the same. Fig. 3 is a vertical sectional view. Fig. 4 is a detail view, in longitudinal section, of a portion of the shaft and sleeve.

Referring to the drawings, A indicates a casing constructed, preferably, of two members, as shown, cylindrical in shape and having its members connected to adjust or vary the diameter of the casing. This is for the purpose of enabling the device to be applied to pans or crocks of different diameters in which the stirring or mixing operation is to be performed. Such a vessel is indicated at B and will be selected of such depth as to enable the stirring means hereinafter described to reach sufficiently near to the bottom of the vessel to perform the operation of stirring and mixing and in the case of bread-sponge aerating the same in a satisfactory manner.

For the purposes of the above-mentioned adjustment, at the same time keeping the two members $A'$ $A^2$ of said casing in proper longitudinal relation to each other, each of the members has attached to it an arm $a$, preferably of steel, curved in shape, and somewhat flexible, and each of said members also has a bearing $a'$, shaped to fit its corresponding arm $a$ and allow the latter to slide therein as the two casing members are adjusted toward or from each other. The arms are attached at such points as to leave beyond them extensions $a^2$, between which and the arms the other edges $a^3$ of said members are received. After adjustment the arms $a$ may be secured in place by suitable fastening means, such as projections 1, soldered to the casing in line with the arms and received in perforations 2 in the latter.

3 indicates supports attached near the lower part of the casing and adapted to rest upon and somewhat inclose the upper edge of the vessel B. In order to keep the casing in place on such vessel, I combine therewith holding means to prevent the vertical movement of the casing from the vessel in the illustration consisting of elastic metallic plates 4, adjustably connected with the casing, as by screw-threaded pins 5, soldered or otherwise secured in the casing, projecting through slots 6 in said plates and having on their outer ends thumb-nuts 7. The holding devices engage beneath the flange $b$ of the vessel by means of projections 8 and are adjustable longitudinally of the casing by means of said slots. The casing may be readily applied to and removed from the same vessel by merely springing slightly outward the lower ends of the arms 4 and lifting the casing up. In applying the casing to different vessels the parts 4 may be adjusted as required by the above-described means.

The stirring and mixing means proper comprises a transverse rotary shaft 9, passing through the casing members and having bearings therein at 10. For convenience I provide several sets of such bearings arranged one above the other, enabling the shaft to be mounted at the desired distance above the top of the vessel B. Said shaft is operated by a crank 11, for which may be substituted a suitable power device in a machine of large size or one which is to be very rapidly operated. On said shaft is fixed a sleeve 12, carrying stirrer-blades which are ordinarily situated at or near one side of the vessel. Said sleeve may be longitudinally adjustable on the shaft to place the blades nearer to or farther from the center of the vessel and is held in place by a cotter-pin 13, passing through perforations 14 in the sleeve and one or more perforations 15 in said shaft. The sleeve is ordinarily adjusted to engage the casing at one end, and the shaft at that end is provided on the outside of the casing with a perforation 16, in which is fixed a pin 17. The shaft is thus held longitudinally in place, while free to revolve. The casing member at the other side of the device may be freely adjusted along the shaft in regulating the diameter of the machine, as above described.

While the blades 18 may be of any suitable number, I find the number and arrangement shown to be efficient—that is to say, three blades, each having an arm at each side of the sleeve, said arms being successively a little in advance of each other, so that they do not all enter and act upon the material at the same time. The blades are somewhat curved from end to end to correspond more or less with the general curvature of the casing and are furthermore twisted into a propeller-like form inclined to the planes of rotation to more efficiently act upon the material.

In operating upon any material to be stirred and mixed, such as bread-sponge, the blades will be caused to cut rapidly into the sponge, dividing and subdividing it, giving to the whole mass of material a horizontal rotation in the vessel and bringing all parts within the action of the blades. Furthermore, the different parts of the material are propelled with different velocities by the various faces of the blades, and the whole action of the machine is to thoroughly mix the mass.

The machine has a very efficient aerating action by carrying air down into the mass and by carrying portions of the sponge up out of the mass and then down into it, which greatly promotes the lightness and good quality of the bread.

The machine is very easy of operation and accomplishes the necessary work in much less than the time required with the ordinary appliances.

What I claim is—

1. In a mixing-machine, for bread and other purposes, the combination with a casing which is substantially cylindrical around a vertical axis of propeller-like rotary arms having their sides inclined relative to vertical planes to produce a horizontal rotation of the mass to be mixed, and means for supporting and turning said arms on a horizontal axis, substantially as set forth.

2. In a mixing-machine for bread and other purposes, the combination of propeller-like rotary arms turning in vertical planes having their sides inclined relative to vertical planes to produce a horizontal rotation of the mass to be mixed and bent longitudinally in the direction of the axis of rotation, a casing which is substantially cylindrical around a vertical axis and means for supporting and turning said arms, substantially as set forth.

3. In a mixing-machine, a casing formed of two parts connected together and relatively adjustable to vary the diameter of the casing.

4. In a mixing-machine, the combination of a casing formed of separate parts adjustable to vary the diameter of the casing, a horizontal shaft passing through the casing, one of the parts of the casing being adjustable on the shaft, and stirrer-blades carried by said shaft.

5. In a mixing-machine, the combination of a casing formed in parts adjustable relative to each other, and means for securing said parts together in their adjusted position.

6. In a mixing-machine, a casing formed of separate parts adjustable to vary the diameter of the casing, and means for connecting said parts consisting of arms $a$ and bearings $a'$.

7. In a mixing-machine, a casing formed of separate parts adjustable to vary the diameter of the casing and having supports for resting the same upon the rim of a vessel.

8. In a mixing-machine, a casing formed of separate parts adjustable to vary the diameter of the casing and having supports for resting the same on the rim of a vessel, combined with holding devices adapted to engage beneath such rim.

9. In a mixing-machine, a casing formed of separate parts adjustable to vary the diameter of the casing and having supports for resting the same upon a vessel, combined with elastic and adjustable holders for engaging beneath the rim of such vessel.

10. A portable mixing vessel open at the top and having an open bottom adapted to be detachably fitted to other portable receptacles, and a horizontal mixing-shaft mounted in the lower part of the said vessel and provided with mixing-arms adapted to project to points below the horizontal plane of the top of a lower receptacle when connected to said upper vessel, substantially as set forth.

11. In a mixing-machine, the combination of a vessel, a removable casing above the same, and a horizontal rotary shaft mounted in said casing independent of the vessel and having stirrer-blades or arms extending into said vessel.

12. In a mixing-machine for bread and other purposes, the combination of a vessel, a horizontal shaft and arms carried by the latter operating downwardly and upwardly in the vessel, said arms being curved inwardly and inclined relatively to the planes of rotation, the arms being arranged at one side only of the vessel, the other side of the vessel being free for the circulation of material, substantially as set forth.

13. In a mixing-machine for bread and other purposes, the combination of a vessel which is substantially cylindrical around a vertical axis, a horizontal shaft and arms carried by the latter operating downwardly and upwardly in the vessel, said arms being inclined relative to the planes of rotation, and the arms at one side of the shaft being inclined in a direction opposite to the inclination of the arms at the other side of the shaft, and means for supporting and actuating said arms.

14. In a mixing-machine, the combination of a vessel, a horizontal shaft therein, a sleeve longitudinally adjustable on said shaft and adapted to be rotated thereby, means for connecting the sleeve and shaft against relative longitudinal movement and blades carried by said sleeve, whereby said blades may be adjusted nearer to or farther from the center of the vessel, substantially as set forth.

15. In a mixing-machine, the combination of a casing which is substantially cylindrical around a vertical axis, a horizontal shaft therein, means for rotating the shaft, and propeller-like means on said shaft acting horizontally on the material to produce a circulation of the same in planes substantially parallel with the shaft.

16. In a mixing-machine, the combination of a casing, a horizontal shaft therein, means for rotating the shaft, and propeller-like means on said shaft acting horizontally on the material to produce a circulation of the same in planes substantially parallel with the shaft, said blades acting to force the material in one longitudinal direction on one side of the shaft and in the other direction on the other side of the shaft.

17. An open-bottom casing adapted to be applied to a vessel, and rotary stirring means mounted in said casing and extending below the casing.

18. An open-bottom casing substantially circular around a vertical axis adapted to be applied to a vessel, a rotary shaft extending across the casing, means for turning the shaft, and stirrers on said shaft, substantially as set forth.

19. In a mixing-machine, the combination with the vessel having vertical walls and adapted to hold fluid materials to be mixed, of a horizontal agitating-shaft mounted across said vessel above the normal level of the materials to be mixed, and vertically-rotating arms carried by said shaft and situated between the center and one end thereof, the remainder of the shaft being free of means for engaging with the material, substantially as set forth.

20. In a mixer, the combination of a vessel having a shaft-bearing in each side thereof, a sleeve having stirring-blades, a shaft insertible from the outside of the vessel into said bearings and said sleeve, the latter being arranged horizontally within the vessel, and means for holding said sleeve on the shaft to turn therewith, substantially as set forth.

In testimony whereof I affix my signature in presence of two witnesses.

JOHN H. ELWARD.

Witnesses:
   JNO. P. O. GRABER,
   J. H. SIEBERT.